United States Patent
Morandin et al.

(10) Patent No.: US 10,305,787 B2
(45) Date of Patent: May 28, 2019

(54) DROPPING CELLS OF A SAME PACKET SENT AMONG MULTIPLE PATHS WITHIN A PACKET SWITCHING DEVICE

(71) Applicants: Guglielmo Marco Morandin, San Jose, CA (US); John J. Williams, Jr., Pleasanton, CA (US)

(72) Inventors: Guglielmo Marco Morandin, San Jose, CA (US); John J. Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 211 days.

(21) Appl. No.: 14/687,425

(22) Filed: Apr. 15, 2015

(65) Prior Publication Data

US 2016/0308754 A1   Oct. 20, 2016

(51) Int. Cl.
| H04L 12/743 | (2013.01) |
| H04L 12/26 | (2006.01) |
| H04L 12/707 | (2013.01) |
| H04L 12/833 | (2013.01) |

(52) U.S. Cl.
CPC .............. *H04L 45/24* (2013.01); *H04L 47/31* (2013.01); *H04L 45/7453* (2013.01)

(58) Field of Classification Search
None
See application file for complete search history.

(56) References Cited

U.S. PATENT DOCUMENTS

| 6,816,492 | B1 | 11/2004 | Turner et al. | |
| 7,525,995 | B2 | 4/2009 | Iny | |
| 2005/0174940 | A1* | 8/2005 | Iny | H04L 49/254 370/232 |
| 2008/0002572 | A1* | 1/2008 | Engbersen | H04L 47/10 370/227 |
| 2013/0107872 | A1* | 5/2013 | Lovett | H04L 49/10 370/352 |
| 2014/0064081 | A1 | 3/2014 | Morandin | |
| 2016/0197831 | A1* | 7/2016 | De Foy | H04L 45/7453 370/392 |

\* cited by examiner

*Primary Examiner* — Jason E Mattis
*Assistant Examiner* — Hong Shao
(74) *Attorney, Agent, or Firm* — The Law Office of Kirk D. Williams

(57) ABSTRACT

In one embodiment, cells of a same packet are sent among multiple paths within a packet switching device. Each of these cells is associated with a same drop value for use in determining whether to drop or forward the cell at multiple positions within a packet switching fabric of a packet switching device in light of a current congestion measurement. In one embodiment, the drop value is calculated at each of these multiple positions based on fields of the cell that are packet variant, but not cell variant, so a same drop value is calculated by each cell of a packet. In one embodiment, at least one of these fields provides entropy (e.g., a timestamp of the packet) such that a produced drop value has, or approximately has, an equal probability of being any value within a predetermined range for fairness purposes.

21 Claims, 8 Drawing Sheets

DROPPING CELLS OF A SAME PACKET SENT AMONG MULTIPLE PATHS WITHIN A PACKET SWITCHING DEVICE

TECHNICAL FIELD

The present disclosure relates generally to the forwarding of packets, split into cells, within a packet switching device.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, which often uses longest prefix matching of an Internet Protocol (IP) packet's destination address in determining how to forward the IP packet.

Within a packet switching device, a packet is typically split into multiple cells, with each of these cells forwarded through the packet switching device to a destination point. The packet is reassembled and then further processed (e.g., manipulated and/or forwarded).

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
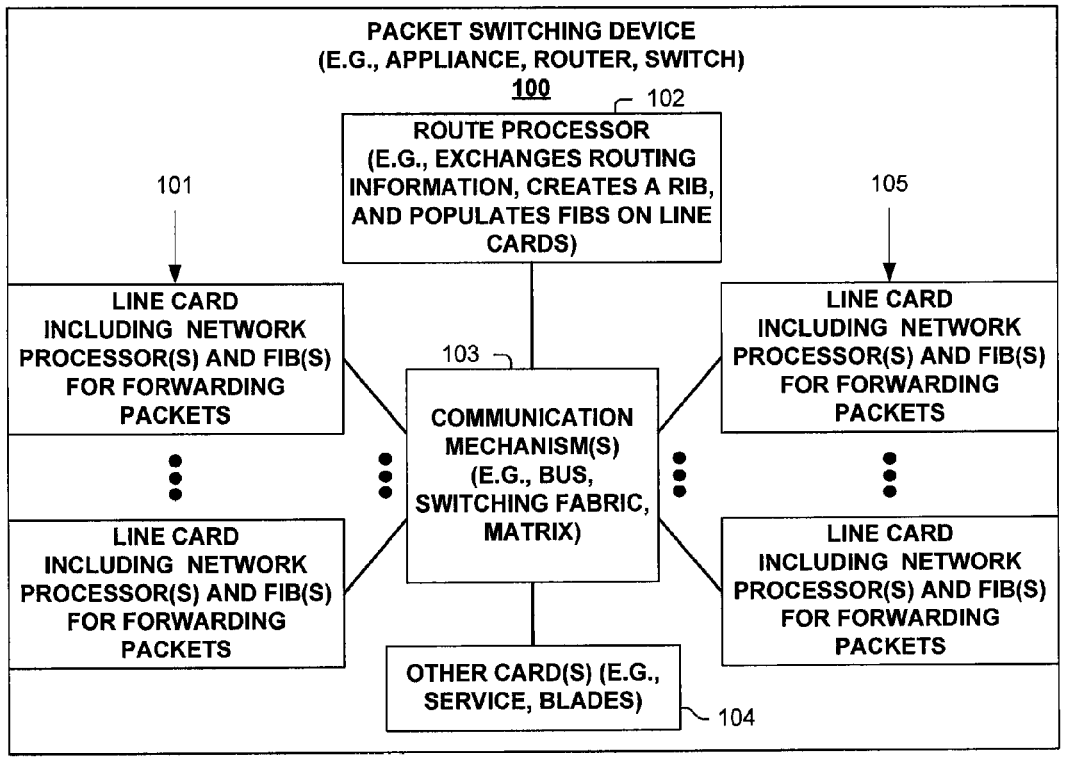
FIG. 1A illustrates a packet switching device according to one embodiment.

Disclosed are, inter alia, methods, apparatus, computer-storage media, mechanisms, and means associated with dropping cells of a same packet sent among multiple paths within a packet switching device. One embodiment includes a method, comprising sending a plurality of packets through a multipath packet switching mechanism of a packet switching device, which includes partitioning each particular packet of the plurality of packets into a plurality of particular cells and sending cells of the plurality of particular cells among a plurality of paths of the multipath packet switching mechanism to a packet reassemble point.

In one embodiment, said sending the plurality of packets through the multipath packet switching mechanism includes for each identifiable cell of the plurality of particular cells of the plurality of particular packets, determining whether to drop or to forward, and correspondingly dropping or forwarding, each said identifiable cell at a plurality of different buffered stages of the multipath packet switching mechanism based on one or more fields of said identifiable cell, wherein said one or more fields are packet-variant fields, with packet-variant fields referring to values that are different among packets of the plurality of packets. In one embodiment, each of the plurality of packets are multicast packets. In one embodiment, said one or more fields of said identifiable cell are also cell-invariant fields, with cell-invariant fields referring to values that are the same for each cell of a packet of the plurality of packets.

2. Description

Disclosed are, inter alia, methods, apparatus, computer-storage media, mechanisms, and means associated with dropping cells of a same packet sent among multiple paths within a packet switching device. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

One embodiment includes a method, comprising: sending a plurality of packets through a multipath packet switching mechanism of a packet switching device, which includes partitioning each particular packet of the plurality of packets into a plurality of particular cells and sending cells of the plurality of particular cells among a plurality of paths of the multipath packet switching mechanism to a packet reassemble point. In one embodiment, said sending the plurality of packets through the multipath packet switching mechanism includes for each identifiable cell of the plurality of particular cells of the plurality of particular packets, determining whether to drop or to forward, and correspondingly dropping or forwarding, each said identifiable cell at a plurality of different buffered stages of the multipath packet switching mechanism based on one or more fields of said identifiable cell, wherein said one or more fields are packet-variant fields, with packet-variant fields referring to values that are different among packets of the plurality of packets.

In one embodiment, each of the plurality of packets are multicast packets. In one embodiment, the multipath packet switching mechanism forwards, but does not drop, cells of unicast packets. In one embodiment, said one or more fields of said identifiable cell are also cell-invariant fields, with cell-invariant fields referring to values that are the same for each cell of a packet of the plurality of packets. In one embodiment, said determining whether to drop or forward each said identifiable cell at the plurality of different buffered stages includes hashing said one or more fields of said identifiable cell into a hash result and comparing to a drop threshold. In one embodiment, the drop threshold is reflective of a current measure of congestion within the multipath packet switching mechanism. In one embodiment, the current measure of congestion is a measure of congestion on a particular path of the plurality of paths that said identifiable cell is taking through the multipath packet switching mechanism to the packet reassemble point. In one embodiment, the measure of congestion is performed using a shadow queue.

In one embodiment, said hash value or the drop threshold is reflective of a priority level of said identifiable cell, such that cells of a higher priority are more likely to be dropped over cells of a lower priority. In one embodiment, each said identifiable cell of an identifiable packet of the plurality of packets is said hashed to a same said hash result. In one embodiment, said one or more fields of said identifiable cell include a particular timestamp and a particular ingress point identifier; and wherein said hashing said one or more fields of said identifiable cell into a hash result includes bit manipulation of bits of both the timestamp and ingress point identifier associated with said identifiable cell. In one embodiment, said determining whether to drop or to forward, and correspondingly dropping or forwarding, each said identifiable cell is performed independently of a layer-3 packet flow of packet from which said identifiable cell was the result of said partitioning. In one embodiment, said one or more fields of said identifiable cell include a snapshot of a time-varying value produced by the packet switching device adding cell-invariant and packet-variant entropy to said identifiable cell.

In one embodiment, said determining whether to drop or forward each said identifiable cell at the plurality of different buffered stages includes hashing said one or more fields of said identifiable cell into a hash result and comparing to a drop threshold; and wherein the drop threshold is reflective of a current measure of congestion within the multipath packet switching mechanism. In one embodiment, said one or more fields of said identifiable cell include a particular timestamp and a particular ingress point identifier; and wherein said hashing said one or more fields of said identifiable cell into a hash result includes bit manipulation of bits of both the timestamp and ingress point identifier associated with said identifiable cell.

One embodiment includes determining for each particular packet of the plurality of packets a drop comparison value prior to sending cells resulting from said partitioning of said particular packet through the multipath packet switching mechanism; wherein said one or more fields of said identifiable cell includes the drop comparison value corresponding to the packet from which said identifiable cell is a partition.

One embodiment includes a packet switching device, comprising: a plurality of interfaces configured to send and receive packets; and a packet switching mechanism, including a plurality of cell-switched buffered stages, configured to packet switch packets among said interfaces. In one embodiment, the packet switching device is configured to send a plurality of packets through the packet switching mechanism, which includes configuration to partition each particular packet of the plurality of packets into a plurality of particular cells and send cells of the plurality of particular cells among a plurality of paths of the multipath packet switching mechanism to a packet reassemble point; wherein said configuration to send the plurality of packets includes configuration to determine for each identifiable cell of the plurality of particular cells of the plurality of particular packets, whether to drop or to forward, and correspondingly dropping or forwarding, each said identifiable cell at a plurality of different buffered stages of the multipath packet switching mechanism based on one or more fields of said identifiable cell and a current measure of congestion within the multipath packet switching mechanism, wherein said one or more fields are packet-variant and cell-invariant fields, with packet-variant referring to values that are different among packets of the plurality of packets and cell-invariant fields referring to values that are the same for each cell of a packet of the plurality of packets.

In one embodiment, the current measure of congestion is a measure of congestion on a particular path of the plurality of paths that said identifiable cell is taking through the multipath packet switching mechanism to the packet reassemble point which can vary from an overall congestion measurement of the multipath packet switching mechanism.

One embodiment includes a packet switching device, comprising: a plurality of interfaces configured to send and receive packets; and a packet switching mechanism, including a plurality of cell-switched buffered stages, configured to packet switch packets among said interfaces. In one embodiment, the packet switching device is configured to send a plurality of packets through the packet switching mechanism, which includes configuration to partition each particular packet of the plurality of packets into a plurality of particular cells and send cells of the plurality of particular cells among a plurality of paths of the multipath packet switching mechanism to a packet reassemble point; wherein said configuration to send the plurality of packets includes configuration to determine for each identifiable cell of the plurality of particular cells of the plurality of particular packets, whether to drop or to forward, and correspondingly dropping or forwarding, each said identifiable cell at a plurality of different buffered stages of the multipath packet switching mechanism based on one or more fields of said identifiable cell and a current measure of congestion within the multipath packet switching mechanism, wherein said one or more fields are packet-variant and cell-invariant fields, with packet-variant referring to values that are different among packets of the plurality of packets and cell-invariant fields referring to values that are the same for each cell of a packet of the plurality of packets; and wherein said determining whether to drop or forward each said identifiable cell at the plurality of different buffered stages includes hashing, at each of the plurality of different buffered stages, said one or more fields of said identifiable cell into a hash result and comparing to a drop threshold; and wherein the drop threshold is reflective of the current measure of congestion within the multipath packet switching mechanism.

In one embodiment, the current measure of congestion is a measure of congestion on a particular path of the plurality of paths that said identifiable cell is taking through the multipath packet switching mechanism to the packet reassemble point which can vary from an overall congestion measurement of the multipath packet switching mechanism.

FIGS. 1A-B, 2A-C and 3 and their discussion herein are intended to provide a description of various, but non-limiting, exemplary packet switching systems used according to one embodiment.

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group), and with one or more processing elements that are used in one embodiment associated with dropping cells of a same packet sent among multiple paths within a packet switching device. Packet switching device 100 also has a control plane with one or more processing elements 102 for managing the control plane and/or control plane processing of packets associated with dropping cells of a same packet sent among multiple paths within a packet switching device. Packet switching device 100 also includes other cards 104 (e.g., service cards, blades) which include processing elements that are used in one embodiment to process packets associated with dropping cells of a same packet sent among multiple paths within a packet switching device, and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, line cards 101 and/or 105 and/or communications mechanism 103 (e.g., a buffered switch fabric) preferentially drop cells of a same packet sent among multiple paths within a packet switching device in response to a congestion condition, with the selection of this packet at a current time being performed in a fair manner, such as, but not limited to, avoiding giving positive or negative preferential service to one or more inputs of communication mechanism 103.

Figure 1B:
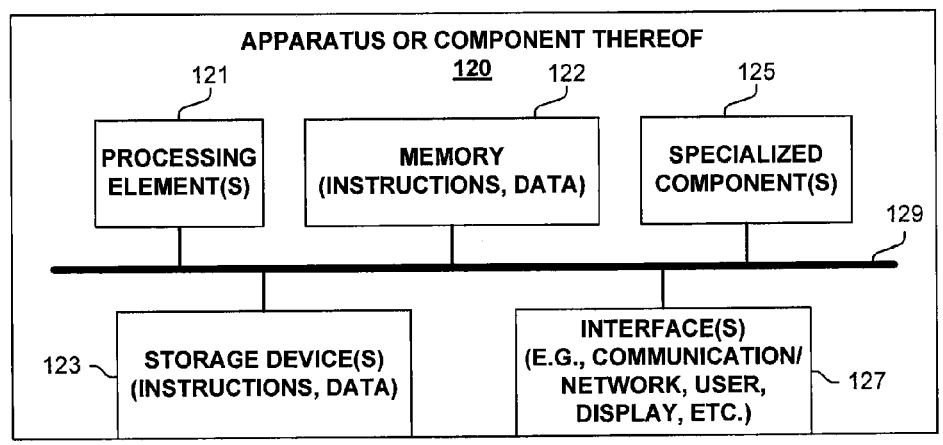
FIG. 1B illustrates an apparatus according to one embodiment.

FIG. 1B is a block diagram of an apparatus 120 used in one embodiment associated with dropping cells of a same packet sent among multiple paths within a packet switching device. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 2A:
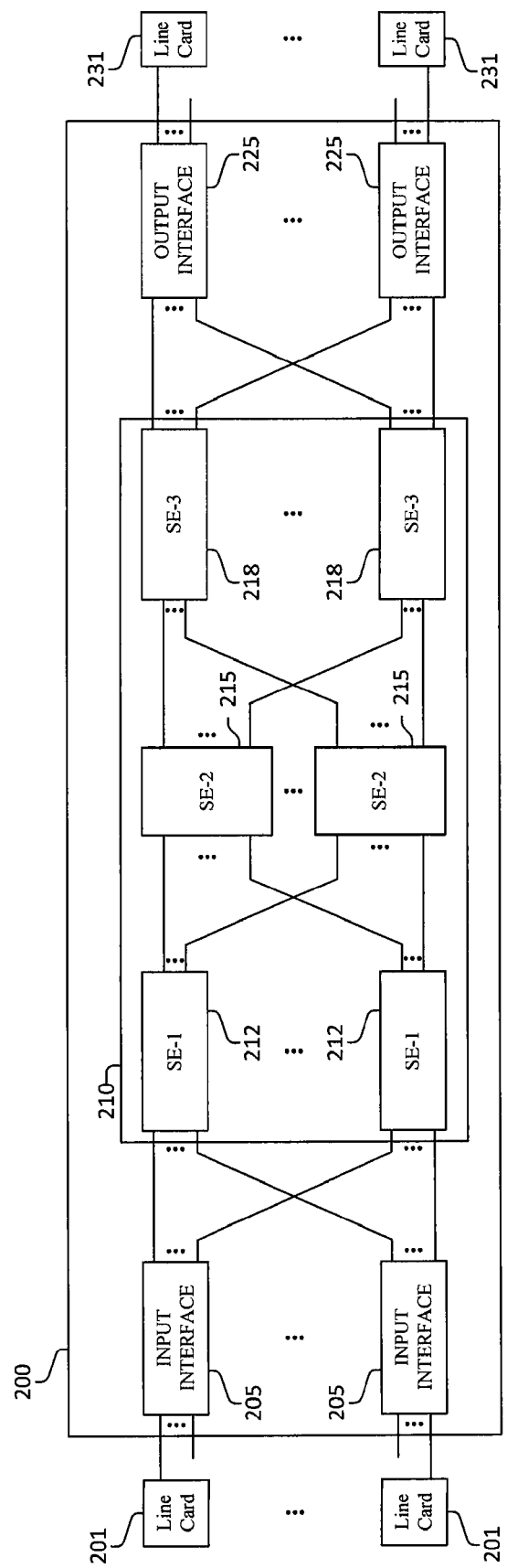
FIG. 2A illustrates a packet switching device according to one embodiment.
Figure 2B:
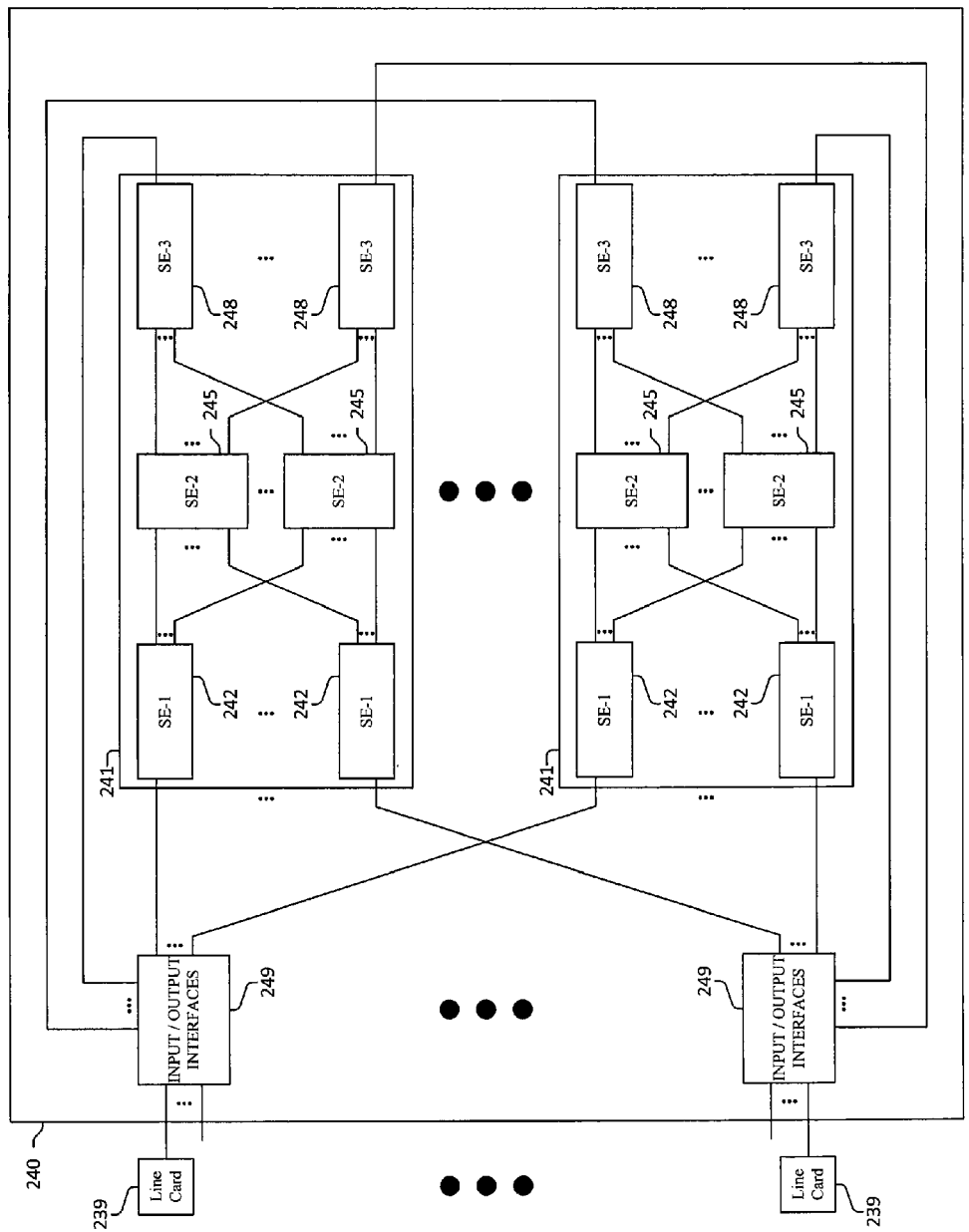
FIG. 2B illustrates a packet switching device according to one embodiment.
Figure 2C:
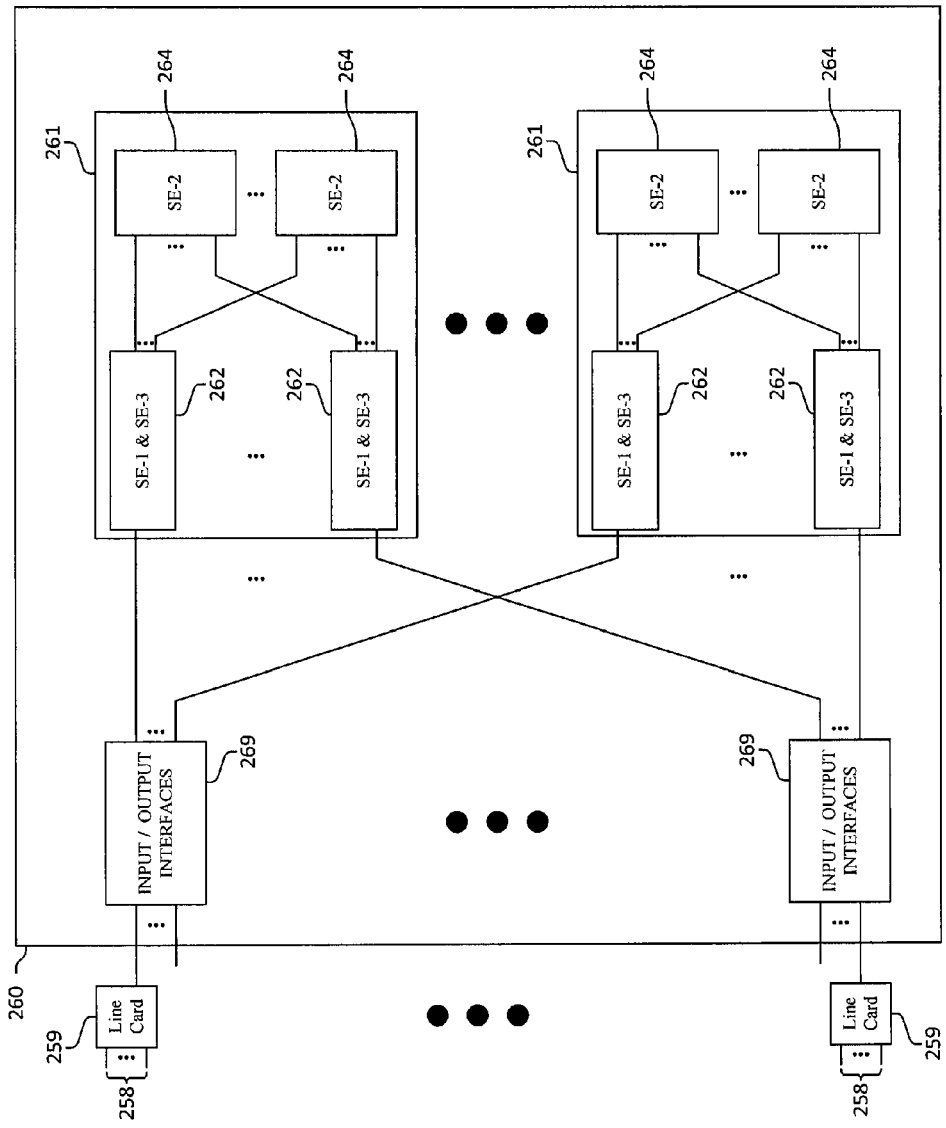
FIG. 2C illustrates a packet switching device according to one embodiment.

FIGS. 2A-C illustrate the basic topology of different exemplary packet switching systems. FIG. 2A illustrates an exemplary packet switch 200 having multiple inputs and outputs and a single interconnection network 210. FIG. 2B illustrates an exemplary packet switch 240 having multiple interconnection networks 241 and folded input and output interfaces 249. FIG. 2C illustrates an exemplary folded packet switch 260 having multiple interconnection networks 261 and folded input and output interfaces 269. In one embodiment, each of these packet switches 200, 240 and 260 preferentially drop cells of a same packet sent among multiple paths within a packet switching device in response to a congestion condition, with the selection of the same packet at a current time being performed in a fair manner. Of course, the invention is not limited to these illustrated operating environments and embodiments, and the packet switching systems may have more or less elements.

FIG. 2A illustrates an exemplary embodiment of a packet switch 200. Packet switch 200 comprises multiple input interfaces 205, interconnection network 210, and output interfaces 225. Input interfaces 205 and output interfaces 225 are both coupled over multiple links to interconnection network 210. Line cards 201 and 231 are coupled to input interfaces 205 and output interfaces 225. In certain embodiments including other packet switching topologies, line cards or their functionality may be included in the packet switch itself, or as part of the packet switching system.

In one embodiment, interconnection network 210 comprises multiple switch elements SE-1 212, SE-2 215, and SE-3 218 that are interconnected by multiple links. Line cards 201 and 231 may connect to other systems (not shown) to provide data items (e.g., packets) to be routed by packet switch 200. In one embodiment, preferentially dropping of cells of a same packet sent among multiple paths within a packet switching device in response to a congestion condition (with the selection of the same packet at a current time being performed in a fair manner) may be performed at one or more of the line cards 201, 231, input interfaces 205, switch elements SE-1 212, SE-2 215, and SE-3 218, output interfaces 225, and/or other locations within packet switch 200 or the packet switching system.

FIG. 2B illustrates another exemplary operating environment and embodiment of a packet switch 240. Packet switch 240 comprises multiple folded input and output interfaces 249 interconnected over multiple links to interconnection networks 241, which are interconnected over multiple links returning to input and output interfaces 249. In one embodiment, interconnection networks 241 comprise multiple switch elements SE-1 242, SE-2 245, and SE-3 248 also interconnected by multiple links. Interfaces 249 may connect via bi-directional links to line cards 239 that connect with other systems (not shown) to provide data items (e.g., packets) to be routed by packet switch 240. In one embodiment, preferentially dropping of cells of a same packet sent among multiple paths within a packet switching device in response to a congestion condition (with the selection of the same packet at a current time being performed in a fair manner) may be performed at one or more of the line cards 239, input and output interfaces 249, switch elements SE-1 242, SE-2 245, and SE-3 248, and/or other locations within packet switch 240 or the packet switching system.

FIG. 2C illustrates another exemplary operating environment and embodiment of a packet switch 260. Packet switch 260 has a folded network topology. Packet switch 260 comprises multiple folded input and output interfaces 269 interconnected over multiple links to interconnection networks 261, which are interconnected over multiple links returning to interfaces 269. In one embodiment, interconnection networks 261 comprise multiple switch elements SE-1 & SE-3 262 and SE-2 264 also interconnected by multiple links. Interfaces 269 may connect via bi-directional links to line cards 259 which connect via ports 258 to other systems (not shown) to provide data items to be routed by packet switch 260. In one embodiment, preferentially dropping of cells of a same packet sent among multiple paths within a packet switching device in response to a congestion condition (with the selection of the same packet at a current time being performed in a fair manner) may be performed at one or more of the line cards 259, input and output interfaces 269, switch elements SE-1 & SE-3 262 and SE-2 264, and/or other locations within packet switch 260 or the packet switching system.

Figure 3:
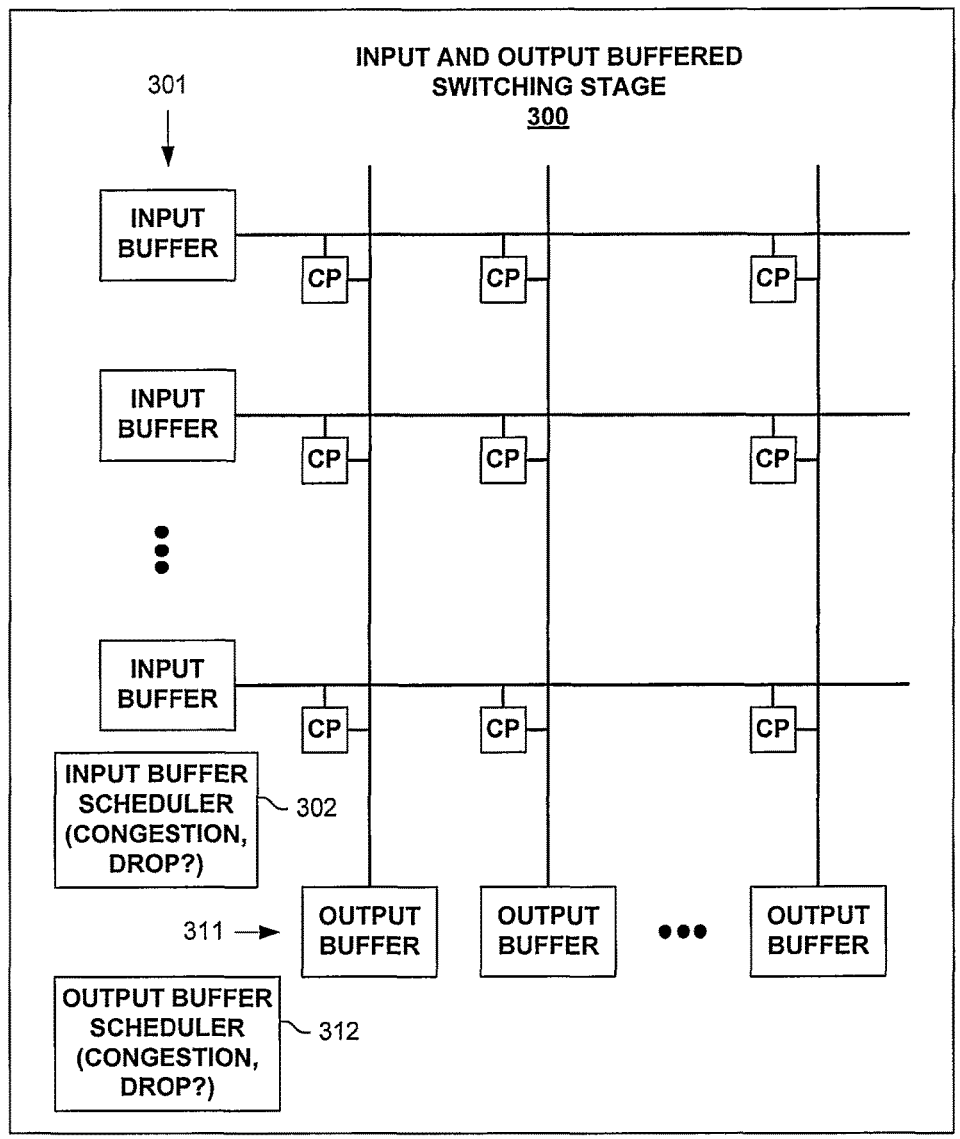
FIG. 3 illustrates a packet switching mechanism according to one embodiment.

FIG. 3 illustrates a packet switching mechanism according to one embodiment, and in particular, input and output buffered switching stage 300. In one embodiment, an input and output buffered switching stage 300 is used in switch elements within a packet switching device. In one embodiment, a switching mechanism other than input and output buffered switching stage 300 is used in switch elements within a packet switching device.

Input and output buffered switching stage 300 includes input buffers 301 and output buffers 311, which buffer cells. In one embodiment, input buffer scheduler 302 and output buffer scheduler 312 determine which cells to forward between input buffers 301 and output buffers 311 based on earliest timestamps (TS), and with tie-breaker values (TBVs) determined from manipulation of ingress point identifiers associated with said cells having a same timestamp. In one embodiment, input buffer scheduler 302 determines the cell forwarding in the horizontal paths shown in FIG. 3, while output buffer scheduler 312 determines the cell forwarding in the vertical paths shown in FIG. 3. In one embodiment, input buffer scheduler 302 and/or output buffer scheduler 312 determines whether or not to drop a packet in light of congestion with the packet switching device, packet switching mechanism and/or switching stage 300.

In a cell-based switching mechanism (e.g., fabric), packets are split into multiple cells and sent through the switching mechanism. To load balance effectively and to send the packet quickly, cells belonging to each packet are sprayed across the multiple paths to the packet reassembly buffer so they can transgress the switching mechanism in parallel.

When excessive traffic is injected into the switching mechanism that will result in congestion, the excess traffic is typically reduced by dropping cells, otherwise severe blocking can occur. For example, if two-percent excess traffic is injected, and a packet consists of fifty cells, the expected cell drop rate is two percent, which is one cell per packet. In this context, if one cell of a packet is dropped by the switching mechanism, the entire packet will be dropped. Thus, if one or more cells from each packet are dropped, all of these packets will be dropped collapsing the performance of the switching fabric. This phenomenon can be most severe for multicast, which is unregulated, as opposed to unicast, where an end-to-end control loop regulates the traffic injection and higher-layer protocols provide for retransmission of missing unicast packets.

If cells are to be dropped, better performance results if cells of a same packet are dropped, then cells of a lot of different packets are dropped. One embodiment targets particular cells in preference to other cells such that all the cells of a particular packet have about the same probability of getting dropped. Some cells of a packet will have a lower probability of being dropped, while cells of other packets will have higher probability of being dropped.

In one embodiment, the number of cells to be dropped is related to a current measure of congestion. As the measure of congestion increases, more cells are dropped. One embodiment uses a same probability of dropping for each cell of a same packet, with this probability varying among different packets and respectively their cells. For each packet, one embodiment provides for fairness of dropping of cells of packet having a same priority level by determining for each packet a drop value that is within a range with all values within the range being equal/approximately equal probable. For example, one embodiment determines a value ranging from zero and seven, from zero to fifteen, or some other range depending on the desired number of distinguishable levels of the drop value is desired. This drop value is then compared to a drop threshold value to determine whether to drop the cell, with the drop threshold value being related to a measure of congestion. For example, a certain level of congestion is acceptable, but above this level, it is desirable to drop cells, and preferably, cells of a same packet before cells of different packets. One embodiment accommodates this acceptable threshold level by adjusting the drop value or drop threshold. One embodiment provides for different priorities of packets by adjusting the drop value or drop threshold such that cells of packets of a lower priority are dropped before cells of a higher priority. In one embodiment, only multicast cells are dropped using this described technique.

In one embodiment, an independent drop decision is performed by each congestion point within a switching mechanism on a per-cell basis, with cells of a packet being sent over different paths to the packet reassembly buffer. One embodiment uses packet-variant, but cell-invariant, values to determine whether to drop a cell. Packet-variant fields referring to values that are different among packets of the plurality of packets, while cell-invariant fields referring to values that are the same for each cell of a packet of the plurality of packets. All cells of a packet will be associated with a same one or more values, with cells of a different packet associated with different one or more values.

In one embodiment, prior to sending cells of a particular packet, the drop value is determined for the particular packet, with each of its cells carrying this drop value. In one embodiment, this drop value is a pseudorandom or truly random value within the desired drop threshold range. In one embodiment, this drop value is a function of variant fields in a packet, but that contains significant entropy (e.g., based on a timestamp) and possibly also a function of packet-variant values (e.g., source identifier of the switching mechanism, multicast group identifier, destination of reassembly buffer, packet destination) such that given the entropy in the timestamp, the resultant drop value has any equal probability of being any value within the range of possible drop values. In other words, it must be a good hash function.

One embodiment avoids the extra overhead bits (and its consumed bandwidth) to carry the drop value with each cell by calculating the drop value at each congestion point based on one or more packet-variant, but cell-invariant fields (e.g., these fields are the same for each cell of a packet, but differ between packets). One embodiment uses a same hash function to generate a same drop value for each cell of a packet. In other words, one embodiment uses a same seed to the same hash function to produce a same drop value at each of multiple points within the switch fabric. Thus, if the level of congestion is the same for each of the paths through the switching mechanism, all or no cells of a packet will be dropped (at that instant) in one embodiment.

In one embodiment, any metric for congestion can be used. In one embodiment, each congestion point is provided a same level of congestion to use in making its packet dropping decisions. In one embodiment, the measure of congestion is a different measurement among different paths through the packet switching mechanism to a same reassembly buffer. In one embodiment, the measure of congestion is a measure of the occupancy level of a buffer, such as, but not limited to, the occupancy level of an output buffer on the path through the packet switching mechanism that is being taken by the particular cell. One embodiment uses a shadow queue to measure congestion. A shadow queue acts like the output queue it is "shadowing," but operates at a marginally slower drain rate. Thus, the occupancy level of the shadow queue will grow faster in times of congestion, but provides a congestion-level indication before that congestion level is actually reached so preemptive action can be taken to avoid that congestion level.

Figure 4A:
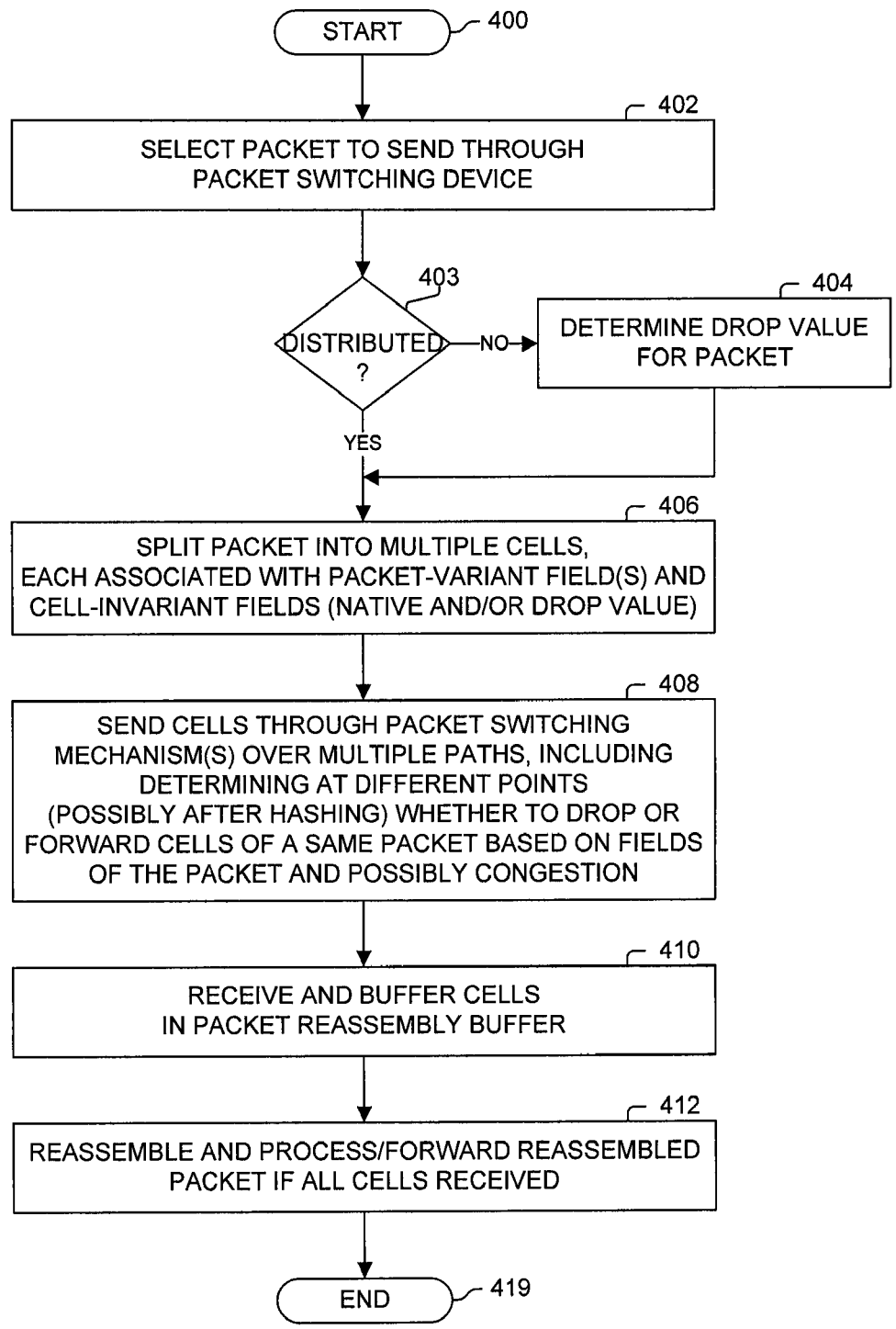
FIG. 4A illustrates processes according to one embodiment.

FIG. 4A illustrates processes performed in one embodiment. Processing of the illustrated flow diagram commences with process block 400. In process block 402, a packet is selected to be sent through the cell-switching mechanism (e.g., through the switching fabric). As determined in process block 403, if the drop value is not to be determined in a distributed fashion (e.g., at the congestion points), then process block 404 is performed, else processing proceeds directly to process block 406. In process block 404, the drop value is determined such as, but not limited to, determining a pseudorandom or truly random value, using a hash function on a packet-variant value with significant entropy. Continuing in process block 406, the packet is split into cells, with each of the cells associated with a packet-variant field(s) and a cell-invariant field(s), which includes the determined drop value if process block 404 was performed.

In process block 408, the cells of the packet are sent (typically in parallel so that they reach the packet reassembly buffer as soon as possible) through the packet switching mechanism(s) over multiple paths, which includes determining at different points within the switching mechanism(s) whether to drop or forward the corresponding cell based on fields of the packet, and typically based on a measure of congestion. In one embodiment, a drop value is calculated at each of these different points based on one or more fields of the cell. In process block 410, the non-dropped cells are received in the packet reassembly buffer. In process block 412, the packet is reassembled and processed/forwarded if all of the cells are received. Processing of the flow diagram of FIG. 4A is complete as indicated by process block 419.

Figure 4B:
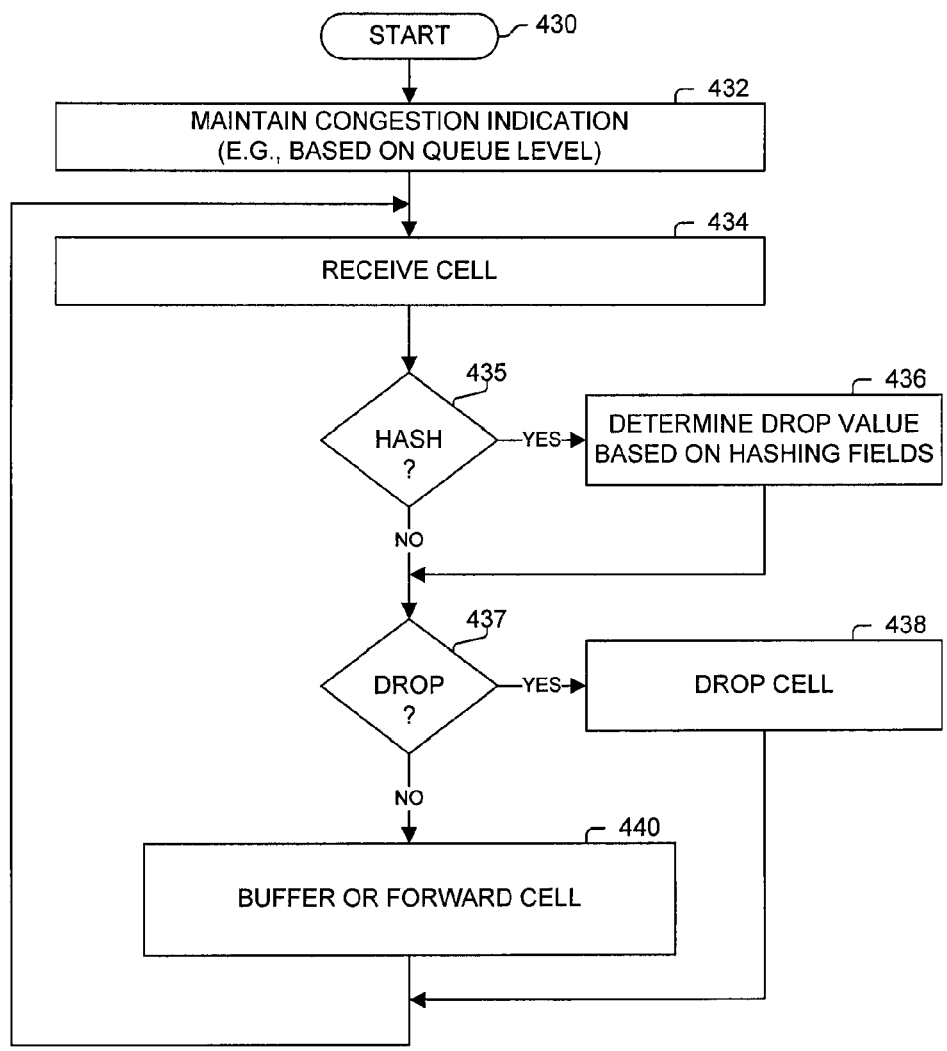
FIG. 4B illustrates processes according to one embodiment.

FIG. 4B illustrates processes performed in one embodiment. Processing of the illustrated flow diagram commences with process block 430. In process block 432, a congestion level indication is maintained. In one embodiment, this congestion level indication is locally determined, such as by, but not limited to, being based on a path through a packet switching mechanism such as an occupancy level of a buffer, being based on a destination of a path such as the occupancy level of a reassembly buffer, etc. In one embodiment, this congestion level indication reflects a more global congestion level, such as, but not limited to, an overall congestion level of the switching mechanism.

In process block 434, a cell is received. As determined in process block 435, if the drop value needs to be determined, then in process block 436, the drop value is determined based on hashing one or more packet-variant, cell-invariant fields of the cell. In process block 437, the drop value (possibly hash value) is compared against the maintained congestion level indication to determine whether to drop or forward the cell. If determined in process block 437 to drop the cell, then in process block 438 the cell is dropped; otherwise if determined in process block 437 not to drop the cell, then in process block 440 the cell is forwarded or buffered (e.g., for further processing/forwarding). Processing of the flow diagram of FIG. 4B returns to process block 434 to receive and process the next cell.

Figure 5:
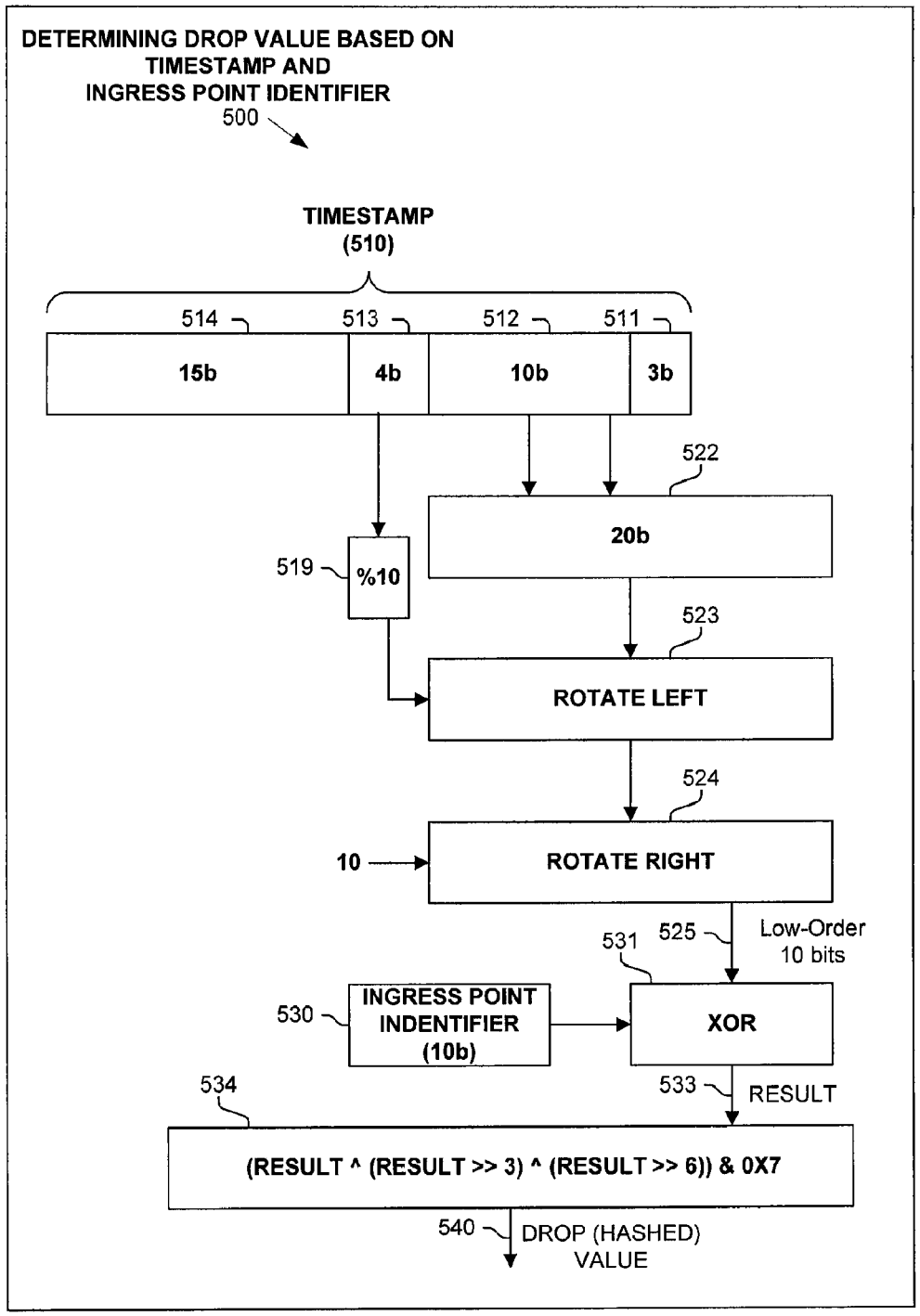
FIG. 5 illustrates processes according to one embodiment.

FIG. 5 illustrates a process performed in one embodiment to determine a drop value 540 based on a timestamp 510 and ingress point identifier 530 (e.g., currently associated with a cell being sent through the switching mechanism). Timestamp 510 is the same for all cells of a packet, and provides entropy to distribute the determined result 540 evenly across the range of values for cells of different packets. Ingress point identifier 530 is the same for all cells of a packet, as it reflects an input point to the current switching mechanism.

As shown, timestamp 510 includes bit ranges 511-514 of varying number of bits (bit is identified as lower case 'b'). Two copies of bits 512 of timestamp 510 are concatenated (522), when are then rotated left (523) by the number of bit positions identified by the value bits 513 of timestamp 510 modulus ten (519) (e.g., remainder after an integer division of ten), then rotated right ten bit positions (524). An exclusive-OR operation (531) is then performed using the resultant low-order ten bits (525) of the rotate right operation (524) and the ten-bit ingress point identifier 530 resulting in a result 533. Result 533 is then further bit-manipulated (534) to generate the three-bit drop/hashed value 540, which ranges from zero to seven. Therefore, drop/hashed value 540 is deterministically determined/calculated based on timestamp 510 and ingress point identifier 530 which are the same values for each cell of a packet.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
sending a plurality of packets within a packet switching device, which includes partitioning each particular packet of the plurality of packets into a plurality of particular cells and sending cells of the plurality of particular cells among a plurality of paths within a multipath packet switching fabric to a packet reassemble point for said particular packet, with the multipath packet switching fabric including a plurality of different buffered stages;
wherein said sending the plurality of packets through the multipath packet switching fabric includes for each identifiable cell of the plurality of particular cells of the plurality of particular packets: within each of said different buffered switching stages receiving said identifiable cell making a drop decision for said identifiable cell based on a drop probability reflective of a congestion level and one or more fields of said identifiable cell, and dropping said received identifiable cell in response the drop decision being to drop the packet and forwarding said identifiable cell in response the drop decision being to not drop the packet, wherein said one or more fields include at least one packet-variant field, with a packet-variant field referring to a same field of each packet of the plurality of packets with the same field containing a value that is different among packets of the plurality of packets.

2. The method of claim 1, wherein each of the plurality of packets are multicast packets.

3. The method of claim 2, wherein the multipath packet switching fabric forwards, but does not drop, cells of unicast packets.

4. The method of claim 1, wherein said one or more fields of said identifiable cell include at least one cell-invariant field, with a cell-invariant field referring to a same particular field of each specific packet of the plurality of packets with the same particular field containing a value that is the same for each cell of said specific packet.

5. The method of claim 4, wherein said drop decision includes hashing said one or more fields of said identifiable cell into a hash result and comparing to a drop threshold.

6. The method of claim 5, wherein the drop threshold is reflective of a current measure of congestion within the multipath packet switching fabric.

7. The method of claim 6, wherein the current measure of congestion is a measure of congestion on a particular path of the plurality of paths that said identifiable cell is taking through the multipath packet switching fabric to the packet reassemble point.

8. The method of claim 6, wherein the measure of congestion is performed using a shadow queue.

9. The method of claim 5, wherein said hash value or the drop threshold is reflective of a priority level of said identifiable cell, such that cells of a higher priority are more likely to be dropped over cells of a lower priority.

10. The method of claim 5, wherein each said identifiable cell of an identifiable packet of the plurality of packets is said hashed to a same said hash result.

11. The method of claim 5, wherein said one or more fields of said identifiable cell include a particular timestamp and a particular ingress point identifier; and wherein said hashing said one or more fields of said identifiable cell into a hash result includes bit manipulation of bits of both the timestamp and ingress point identifier associated with said identifiable cell.

12. The method of claim 5, wherein said drop decision is performed independently of a layer-3 packet flow of packet from which said identifiable cell was the result of said partitioning.

13. The method of claim 4, wherein said one or more fields of said identifiable cell include a snapshot of a time-varying value produced by the packet switching device adding cell-invariant and packet-variant entropy to said identifiable cell.

14. A method, comprising:
sending a plurality of packets through a multipath packet switching fabric of a packet switching device, which includes partitioning each particular packet of the plurality of packets into a plurality of particular cells and sending cells of the plurality of particular cells among a plurality of paths of the multipath packet switching fabric to a packet reassemble point;
wherein said sending the plurality of packets through the multipath packet switching fabric includes for each identifiable cell of the plurality of particular cells of the plurality of particular packets, determining whether to drop or to forward, and correspondingly dropping or forwarding, each said identifiable cell at a plurality of different buffered stages of the multipath packet switching fabric based on one or more fields of said identifiable cell, wherein said one or more fields are packet-variant fields, with packet-variant fields referring to values that are different among packets of the plurality of packets;
wherein said determining whether to drop or forward each said identifiable cell at the plurality of different buffered stages includes hashing said one or more fields of said identifiable cell into a hash result and comparing to a drop threshold; and wherein the drop threshold is reflective of a current measure of congestion within the multipath packet switching fabric; and wherein said one or more fields of said identifiable cell include a particular timestamp and a particular ingress point identifier; and wherein said hashing said one or more fields of said identifiable cell into a hash result includes bit manipulation of bits of both the timestamp and ingress point identifier associated with said identifiable cell.

15. The method of claim 1, comprising determining for each particular packet of the plurality of packets a drop comparison value prior to sending cells resulting from said partitioning of said particular packet through the multipath packet switching fabric; wherein said one or more fields of said identifiable cell includes the drop comparison value corresponding to the packet from which said identifiable cell is a partition; and wherein said drop decision is based on the drop comparison value.

16. A packet switching device, comprising:
a plurality of physical interfaces that send and receive packets; and
a packet switching fabric, including a plurality of cell-switched buffered switching stages, that packet switches packets among said interfaces;
wherein the packet switching device sends a plurality of packets through the packet switching fabric, which includes partitioning each particular packet of the plurality of packets into a plurality of particular cells and sending cells of the plurality of particular cells among a plurality of paths of the packet switching fabric to a packet reassemble point; wherein said sending the plurality of packets includes determining for each identifiable cell of the plurality of particular cells of the plurality of particular packets, whether to drop or to forward, and correspondingly dropping or forwarding, each said identifiable cell at each of the plurality of cell-switched buffered switching stages of the packet switching fabric based on one or more fields of said identifiable cell and a current measure of congestion within the packet switching fabric, wherein said one or more fields are packet-variant and cell-invariant fields, with packet-variant referring to values that are different among packets of the plurality of packets and cell-invariant fields referring to values that are the same for each cell of a packet of the plurality of packets.

17. The packet switching device of claim 16, wherein the current measure of congestion is a measure of congestion on a particular path of the plurality of paths that said identifiable cell is taking through the packet switching fabric to the packet reassemble point which can vary from an overall congestion measurement of the packet switching fabric.

18. A packet switching device, comprising:
a plurality of physical interfaces that send and receive packets; and
a packet switching fabric, including a plurality of cell-switched buffered switching stages, that packet switches packets among said interfaces;
wherein the packet switching device sends a plurality of packets through the packet switching fabric, which includes partitioning each particular packet of the plurality of packets into a plurality of particular cells and sending cells of the plurality of particular cells among a plurality of paths of the packet switching fabric to a packet reassemble point; wherein said sending the plurality of packets includes determining for each identifiable cell of the plurality of particular cells of the plurality of particular packets, whether to drop or to forward, and correspondingly dropping or forwarding, each said identifiable cell at each of the plurality of cell-switched buffered switching stages of the packet switching fabric based on one or more fields of said identifiable cell and a current measure of congestion within the packet switching fabric, wherein said one or more fields are packet-variant and cell-invariant fields, with packet-variant referring to values that are different among packets of the plurality of packets and cell-invariant fields referring to values that are the same for each cell of a packet of the plurality of packets; and wherein said determining whether to drop or forward each said identifiable cell at each of the plurality of cell-switched buffered switching stages includes hashing, at each of the plurality of cell-switched buffered switching stages, said one or more fields of said identifiable cell into a hash result and comparing to a drop threshold; and wherein the drop threshold is reflective of the current measure of congestion within the packet switching fabric.

19. The packet switching device of claim 18, wherein the current measure of congestion is a measure of congestion on a particular path of the plurality of paths that said identifiable cell is taking through the packet switching fabric to the packet reassemble point which can vary from an overall congestion measurement of the multipath packet switching fabric.

20. The method of claim 1, wherein said drop decision is based on a drop threshold which is reflective of a current measure of congestion within the multipath packet switching fabric.

21. The method of claim 20, wherein the current measure of congestion is a measure of congestion on a particular path of the plurality of paths that said identifiable cell is taking through the multipath packet switching fabric to the packet reassemble point.

* * * * *